United States Patent
Roth et al.

(10) Patent No.: US 9,296,619 B2
(45) Date of Patent: Mar. 29, 2016

(54) LARGE CRYSTAL MOLECULAR SIEVES AND THEIR MANUFACTURE

(75) Inventors: Wieslaw Jerzy Roth, Sewell, NJ (US); Carrie L. Kennedy, Washington, NJ (US); Thomas Yorke, Toms River, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1214 days.

(21) Appl. No.: 12/865,679

(22) PCT Filed: Jan. 19, 2009

(86) PCT No.: PCT/EP2009/000388
§ 371 (c)(1),
(2), (4) Date: Apr. 11, 2011

(87) PCT Pub. No.: WO2009/103394
PCT Pub. Date: Aug. 27, 2009

(65) Prior Publication Data
US 2011/0207983 A1    Aug. 25, 2011

Related U.S. Application Data

(60) Provisional application No. 61/030,706, filed on Feb. 22, 2008.

(30) Foreign Application Priority Data

Jun. 11, 2008  (EP) ..................................... 08158024

(51) Int. Cl.
| | | |
|---|---|---|
| C07C 1/20 | (2006.01) |
| C01B 39/38 | (2006.01) |
| B01J 29/06 | (2006.01) |
| B01J 29/40 | (2006.01) |
| C01B 39/46 | (2006.01) |

(52) U.S. Cl.
CPC ................. *C01B 39/38* (2013.01); *B01J 29/06* (2013.01); *B01J 29/40* (2013.01); *C01B 39/46* (2013.01)

(58) Field of Classification Search
None
See application file for complete search history.

(56) References Cited

U.S. PATENT DOCUMENTS

| | | | |
|---|---|---|---|
| 4,375,458 A | | 3/1983 | Dwyer et al. |
| 4,452,907 A | * | 6/1984 | Ball et al. ........................ 502/60 |
| 4,562,055 A | * | 12/1985 | Arika et al. ................... 423/700 |
| 4,908,342 A | | 3/1990 | McWilliams et al. |
| 5,958,366 A | * | 9/1999 | Smith et al. ................... 423/700 |
| 6,013,239 A | | 1/2000 | Chen et al. |
| 2006/0111234 A1 | | 5/2006 | Kim et al. |

FOREIGN PATENT DOCUMENTS

| | | |
|---|---|---|
| CN | 101112996 | 1/2008 |
| CN | 1732127 | 2/2008 |
| EP | 0 021 674 | 1/1981 |
| EP | 0 106 552 | 4/1984 |
| EP | 0 197 775 | 10/1986 |
| JP | A-08-257301 | 10/1996 |
| JP | A-H11-507321 | 6/1999 |
| JP | A-2006-512268 | 4/2006 |
| WO | 00/37398 | 6/2000 |

\* cited by examiner

*Primary Examiner* — Melvin C Mayes
*Assistant Examiner* — Stefanie Cohen
(74) *Attorney, Agent, or Firm* — Darryl M. Tyus

(57) ABSTRACT

A process for the manufacture of large crystal size synthetic porous crystalline molecular sieve requires an aqueous reaction mixture that is organic structure directing agent-free, has a $H_2O/MOH$ molar ratio (M is an alkali metal) of 75 or less, a source of $X_2O_3$ (X is a trivalent element) and a source of $YO_2$ (Y is a tetravalent element). The source of $X_2O_3$ and $YO_2$ is an amorphous material containing both $X_2O_3$ and $YO_2$ and having a $YO_2/X_2O_3$ molar ratio of 15 to 40. The resultant highly crystalline novel materials have crystals with at least one dimension greater than 1 μm, such as greater than 3 μm.

26 Claims, No Drawings

LARGE CRYSTAL MOLECULAR SIEVES AND THEIR MANUFACTURE

CROSS-REFERENCE TO RELATED APPLICATIONS

This application is a 371 National Stage Application of International Application No. PCT/EP2009/000388, filed Jan. 19, 2009, which claims the benefit of U.S. Provisional Application 61/030,706, filed Feb. 22, 2008, and EP 08158024.3, filed Jun. 11, 2008, all of which are incorporated herein by reference in their entirety.

INTRODUCTION OF THE INVENTION

This invention relates to processes for the manufacture of crystalline molecular sieves, to large crystal molecular sieves, particularly but not exclusively large crystal crystalline aluminosilicates, to intermediates for the manufacture of such molecular sieves, and to processes that employ molecular sieves as catalysts and/or absorbents.

BACKGROUND OF THE INVENTION

Aluminosilicates are a well known class of molecular sieve materials which have found widespread use as catalysts and absorbents. The basic structure of these crystalline materials comprises $SiO_4$ tetrahedra (which have four oxygen atoms at the apexes with the silicon atom being at the center) and $AlO_4$ tetrahedra (which have four oxygen atoms at the apexes with the aluminum atom being at the center). These tetrahedra are regularly and three dimensionally connected to each other throughout the structure through the sharing of apex oxygen atoms. This arrangement provides a three-dimensional network structure defining pores that differ in size and shape depending on the arrangement of tetrahedra and composition of the structure. In its simplest terms the material may be considered to be a silicate material in which some of the $Si^{4+}$ ions in the silicate are replaced by $Al^{3+}$ ions. For each $Si^{4+}$ ion replaced by an $Al^{3+}$, the charge must be balanced by having other positive ions such as $Na^+$, $K^+$ or $Ca^{2+}$ present. It is the presence of framework aluminum in aluminosilicates which is important in providing, for example, the catalytic properties of these materials.

A wide variety of synthetic aluminosilicates can be manufactured through various synthesis routes. It has been relatively easy to manufacture certain aluminosilicates such as ZSM-5, MCM-22, zeolite Beta and ZSM-22 with high $SiO_2/Al_2O_3$ ratios, that is, aluminosilicates which have relatively low levels of aluminum present in the framework structure. However, it is difficult to achieve low $SiO_2/Al_2O_3$ ratios of 30 or less, that is, aluminosilicates which have relatively high levels of aluminum. Various attempts to produce such materials have resulted in materials that are non-crystalline and/or are heavily contaminated with other materials.

Large crystal ZSM-5 comprising crystals with a dimension greater than 0.5 μm usually can be prepared without difficulty when the aluminum content in the synthesis mixture is low. As a result, with large crystal ZSM-5, although $SiO_2/Al_2O_3$ ratios of 100 or higher are relatively easily attainable, $SiO_2/Al_2O_3$ ratios of 30 or lower are difficult to attain.

EP-A-021674 (Mobil) teaches that large crystal ZSM-5, having a crystal size in excess of 1 μm, can be prepared from a reaction mixture containing tetra alkylammonium cations provided the $OH^-/SiO_2$ molar ratio is maintained within the range 0.01-0.07.

U.S. Pat. No. 6,013,239 (Mobil) describes a process for the manufacture of large crystal ZSM-5. The process requires the use of a specific group of organic directing agents namely amino-acids. The resulting ZSM-5 crystalline materials have crystal sizes of 1 to 10 μm but the intermediate products obtained prior to calcination contain organic template in the zeolite pores.

WO 00/37398 (Mobil) describes a process for the manufacture of small crystal ZSM-5 which has a $SiO_2/Al_2O_3$ molar ratio of less than 25. The preferred ZSM-5 has a molar ratio of 15-20, and specific materials are disclosed having $SiO_2/Al_2O_3$ molar ratios of 15:1 and 19:1. The synthesis method utilises an amorphous silica-alumina having a $SiO_2/Al_2O_3$ molar ratio of 10:1 to 25:1.

EP-A-0106552 (Togo) describes a process for the manufacture of zeolites similar to ZSM-5 and ferrierite with high $SiO_2/Al_2O_3$ molar ratios. The process described is organic template free and requires the crystallization of a homogeneous phase compound comprising granular amorphous aluminosilicates. The resultant aluminosilicates have $SiO_2/Al_2O_3$ molar ratios in excess of 19.

SUMMARY OF THE INVENTION

Unexpectedly it has now been found that by careful selection of synthesis conditions and materials it is possible to obtain crystalline molecular sieves, especially aluminosilicates, having crystals with at least one dimension greater than 1 μm, such as greater than 3 μm, and even greater than 10 μm. It is to be understood that, although aluminosilicates are predominately based on silica and alumina, there are analogues where the framework aluminum can be partially or completely replaced by one or more other trivalent elements, such as boron, iron or gallium; and the framework silicon can be partially or completely replaced by one or more other tetravalent elements such as germanium. All such analogues are encompassed in the scope of this invention.

In a first aspect, the invention provides a process for the manufacture of a synthetic porous crystalline molecular sieve, which process comprises the steps of:
(a) forming an aqueous reaction mixture, free of organic structure directing agent, comprising a source of $X_2O_3$, a source of $YO_2$, and a source of metal hydroxide MOH, wherein X is a trivalent element, Y is a tetravalent element and M represents an alkali metal, in which reaction mixture;
(i) the molar ratio of $H_2O/MOH$ is 75 or less, and
(ii) at least a portion of the $X_2O_3$ and the $YO_2$ is provided by an amorphous material containing both $X_2O_3$ and $YO_2$, said amorphous material having a $YO_2/X_2O_3$ molar ratio within the range of from 15 to 40;
(b) crystallizing the reaction mixture to produce the porous crystalline molecular sieve; and
(c) recovering the crystallized material.

In a second aspect of the present invention there is provided a synthetic porous crystalline molecular sieve of the MFI structure type in the non-calcined state and free of organic structure directing agent, comprising crystals having at least one dimension greater than 1 μm, preferably greater than 3 μm, more preferably greater than 4 μm and most preferably greater than 10 μm.

In a third aspect the present invention provides a synthetic porous crystalline molecular sieve comprising crystals with at least one dimension greater than 3 μm, preferably greater than 4 μm, more preferably greater than 10 μm, for example, in the range of 10 μm to 20 μm.

Preferably in the second and third aspects of the invention the synthetic porous crystalline molecular sieve having crystals with at least one dimension greater than 1 μm and 3 μm, respectively, comprises:

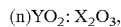

wherein Y is a tetravalent element; X is a trivalent element; and n is at least 2 and less than 30.

In all three aspects of the invention mentioned above, Y represents one or more tetravalent elements, for example selected from silicon and germanium, and is preferably silicon. X represents one or more trivalent elements, for example selected from aluminum, boron, iron and gallium, and is preferably aluminum. Most preferably, Y is silicon and X is aluminum, ie the molecular sieve is an aluminosilicate. In the formula (n)YO$_2$:X$_2$O$_3$ set out above, the value of n is preferably from 2 to 26, such as from 15 to 26, for example 20 to 24.

In a further aspect of the invention there is provided a method for the manufacture of an active synthetic porous crystalline molecular sieve catalyst having at least one dimension greater than 1 μm, which method comprises hydrogen exchange and calcination of the synthetic porous crystalline molecular according to the invention, especially the above-mentioned second aspect of the invention.

In a still further aspect, the invention provides a conversion process for converting hydrocarbons which comprises contacting a hydrocarbon feedstream under hydrocarbon conversion conditions with a synthetic porous crystalline molecular sieve according to the invention or as manufactured by the above-defined synthesis process according to the invention or by the activation method according to the invention, to effect conversion of the hydrocarbon feedstream.

In a yet still further aspect, the invention provides an absorption process which comprises contacting a feedstream containing one or more absorbates under absorption conditions with a synthetic porous crystalline molecular sieve according to the invention or as manufactured by the above-defined synthesis process according to the invention or by the activation method according to the invention, to effect absorption of one or more of the absorbates from the feedstream.

DESCRIPTION OF THE INVENTION

The present invention provides a novel form of molecular sieve having crystals with at least one dimension greater than 3 μm, preferably greater than 4 μm and more preferably greater than 10 μm; and further provides novel pre-cursors to catalytic molecular sieves of the MFI structure type that have crystals with at least one dimension greater than 1 μm and which are in the non-calcined state and free of organic structure directing agent. These materials preferably have compositions wherein the molar relationship: (n)YO$_2$:X$_2$O$_3$, where X and Y are as described above, is such that n is from 2 to less than 30, for example 26 or less. The invention conveniently provides a large crystal, high activity (high proportion of element X) molecular sieve that may be prepared by judicious control of composition and synthesis conditions that does not require use of an organic structure-directing agent. The preferred form of the molecular sieve is an aluminosilicate, such as a zeolite, preferably ZSM-5, ZSM-22, MWW framework zeolite or zeolite beta. Those molecular sieves of the above specified crystal size are believed to be novel compositions of matter.

The crystal sizes identified in the context of the invention are intended to mean that a molecular sieve crystal examined by a conventional technique of scanning electron microscopy (SEM) has at least one dimension of the designated μm value e.g., greater than 3 μm. A convenient method of coming to an approximation of crystal size without use of SEM involves measurement of para-xylene sorption capacity and ortho-xylene diffusion (sorption) time. For example these parameters may be obtained by measuring the para-xylene sorption capacity of the molecular sieve at 120° C. and hydrocarbon partial pressure of 680 Pa (5.1 mm Hg); then measuring the time (in minutes) necessary for ortho-xylene to reach 30 percent of that sorption capacity value (the ortho-xylene sorption capacity being measured at 120° C. and hydrocarbon partial pressure of 507 Pa (3.8 mm Hg)). To a reasonable approximation, an ortho-xylene diffusion (sorption) time measured by this technique that is 50 minutes or more has been found to indicate that the molecular sieve has a crystal size where no dimension is 1 μm or less. In a convenient procedure for measuring the para-xylene sorption capacity of a molecular sieve, the sieve is first dried in thermogravimetric analysis (TGA) equipment under helium at 500 °C for 30 minutes then cooled to 120 ° C. Para-xylene is then pumped over the material at 120 ° C and 680 Pa (5.1 mm Hg) partial pressure. Para-xylene is adsorbed until the full capacity is achieved, as monitored by the weight gain on the microbalance of the TGA. The weight changes are measured by the microbalance in the TGA. The final data may be reported as para-xylene uptake in mg/gram of dried sieve; or in percentage terms (weight of para-xylene adsorbed expressed as a percentage of the dry weight of the molecular sieve sample). The 30% sorption time for ortho-xylene will be determined by a corresponding technique carried out at the sorption conditions for ortho-xylene specified above (120° C./507 Pa partial pressure). The time that is measured by this technique (the so-called "30% orthoxylene sorption time test") is the time in minutes that it takes for the ortho-xylene to be adsorbed to 30% of the total capacity that is recorded for para-xylene. In general, the longer this time, the larger is the crystal size. In a preferred embodiment, the molecular sieve of or manufactured by the process of the present invention is characterized by a 30% ortho-xylene sorption time test value of at least 50 minutes, more preferably at least 60 minutes, such as at least 70 minutes.

In the process of the present invention both the composition of the reaction mixture and form of starting materials is carefully selected. The composition of the reaction mixture is controlled such that the molar ratio of H$_2$O/MOH, where M is an alkali metal such as sodium or potassium, in the reaction mixture is 75 or less. It is preferred that the molar ratio of H$_2$O/MOH is in the range of 20 to 75, particularly 50 or less, for example, from 20 to 50. This last range is especially suitable when it is desired to obtain very large crystals with at least one dimension greater than 10 μm. In addition, the source of X$_2$O$_3$ and the source of YO$_2$ used in the reaction mixture are required to be or to comprise a single source that combines both X and Y elements. Such single source of both X$_2$O$_3$ and YO$_2$ is selected to be amorphous and with a YO$_2$/X$_2$O$_3$ molar ratio of 15 to 40 inclusive.

Preferably the amorphous material containing both X$_2$O$_3$ and YO$_2$ has a YO$_2$/X$_2$O$_3$ molar ratio within the range of from 15 to 35, more preferably from 15 to 32 and most preferably from 15 to 30.

In a preferred embodiment the molecular sieve is an aluminosilicate and the source of X$_2$O$_3$ and YO$_2$ providing both X and Y is an amorphous aluminosilicate which functions as a source of Al$_2$O$_3$ and SiO$_2$. These amorphous materials may sometimes be preferred to as silica stabilized aluminas, silica-alumina, acidic silica-alumina, or silica-alumina hydrates. It is preferred that the alumina is present as its boehmite (alpha alumina monohydrate). It is also preferred that the amorphous source of $X_2O_3$ and $YO_2$, such as amorphous aluminosilicate is substantially free of $Na_2O$. Preferably the amorphous source of $X_2O_3$ and $YO_2$, such as amorphous aluminosilicate, comprises less than 1.0 wt % $Na_2O$, such as less than 0.5 wt % $Na_2O$, more preferably less than 0.1 wt % of $Na_2O$ and most preferably less than 0.01 wt % $Na_2O$. In the case where X is Al and Y is Si, the preferred source of $Al_2O_3$ and $SiO_2$ is a commercial material SIRAL®90 or SIRAL®95 as sold by Sasol/Condea.

It is a requirement of the process that the reaction mixture includes a source of $X_2O_3$ and $YO_2$ that is (1) amorphous and (2) contains both $X_2O_3$ source and $YO_2$ source and (3) has $YO_2/X_2O_3$ molar ratio of 15 to 40. The porous crystalline molecular sieve that may be produced by the process has a $YO_2/X_2O_3$ molar ratio of at least 2 and less than 30. Therefore, in order to achieve a molecular sieve product having a desired $YO_2/X_2O_3$ ratio within the specified range, it is possible in accordance with the invention to adjust the amount of X in the molecular sieve product by optionally including a separate source of $X_2O_3$ in the reaction mixture that is different from the amorphous source of both $X_2O_3$ and $YO_2$ combined.

In a preferred embodiment the reaction mixture contains, in addition to the amorphous source of both $X_2O_3$ and $YO_2$, a separate source of $X_2O_3$. This separate source may be a crystalline material. Preferably the separate source of $X_2O_3$ contributes 50% or less, more preferably from 15 to 50%, such as from 20 to 45%, of the total amount of $X_2O_3$ in the reaction mixture. Of course, if for any reason it is desired to adjust the overall molar ratio of $YO_2:X_2O_3$ in the reaction mixture upward rather than downward, it is equally possible to add a separate source of $YO_2$ to the reaction mixture to supplement the amorphous material containing both $YO_2$ and $X_2O_3$.

It has been found that maintaining the $H_2O/MOH$ mole ratio in the range of 75 or less, together with the other required process features, enables the production of the desired large crystal-dimension content molecular sieves of the invention. Conveniently the ratio is close to 75 but may be lower and still give desirable products, such as in the range of 50 or less, e.g., 20 to 50. The lower end of the range, too, enables production of the target products.

A feature of the manufacturing process is that it is organic free, that is, the reaction mixture does not contain an organic structure-directing agent. This is beneficial from both a cost and an environmental standpoint, since there is no need to use or dispose of the conventionally used organic templates such as amines or alkylammonium compounds.

The manufacturing process of the invention functions with or without added nucleating seeds.

Crystallization may be carried out under either stirred or static conditions. Preferably, the crystallization is carried out under stirred conditions. The crystallization is preferably carried out at a temperature of from 80 to 225° C., more preferably from 100 to 200° C., yet more preferably from 120 to 200° C. and most preferably from 120 to 190° C. The time for reaction is preferably in the range of 10 hours to 60 days, more preferably 10 hours to 10 days and most preferably 10 hours to 130 hours. The resultant crystalline molecular sieve is separated from the mother liquor and recovered. At this stage the crystalline molecular sieve is in the pre-calcined state and in the present invention is free of organic directing agent. The recovered crystalline molecular sieve intermediate may then be treated, to convert it to its acid form for example with ammonium nitrate. This may then be followed by calcination, for example, at a temperature of from 400 to 600° C., such as 500 to 550° C., for example at about 538° C. (1000° F).

Since the molecular sieves of the present invention and those manufactured by the process of the present invention may be synthesized with a relatively low $YO_2/X_2O_3$ molar ratio (that is with relatively high content of element X), the invention embodies molecular sieves with high catalytic activity. Catalytic activity of molecular sieve zeolites, such as ZSM-5, is typically measured by determining their Alpha Value, which compares the catalytic cracking activity of the catalyst (rate of normal hexane conversion per volume of catalyst per unit time) with the activity of a standard silica-alumina cracking catalyst. The Alpha Test is described in U.S. Pat. No. 3,354,078; and in the Journal of Catalysis, Vol. 4, p. 527 (1965); Vol. 6, p. 278 (1966); and Vol. 61, p. 395 (1980). The experimental conditions of the test used herein include a constant temperature of 538° C. and a variable flow rate as described in detail in the Journal of Catalysis, Vol. 61, p. 395 (1980).

In their hydrogen form, the molecular sieves of or manufactured by the process of the present invention preferably have an Alpha Value in excess of 500, more preferably in excess of 800, and most preferably in excess of 1000. Preferably, the molecular sieves of or manufactured by the process of the present invention have a surface area of 200 $m^2g^{-1}$ or greater, as determined by the BET method (S. Brunauer, P. H. Emmet and E. Teller, J. Am. Chem. Soc., 1938, 60, 309) using nitrogen adsorption at liquid nitrogen temperature.

When used as a catalyst, it may be desirable to incorporate the molecular sieves of or manufactured by the process of the present invention with another material that is resistant to the temperatures and other conditions employed in organic conversion processes. Thus the molecular sieves of or manufactured by the process of the invention may be used in the form of an extrudate with binder, in which the molecular sieve is dispersed within a conventional binder. They are typically bound by forming a pill, sphere, or extrudate. The extrudate is usually formed by extruding the molecular sieve, optionally in the presence of a binder, and drying and calcining the resulting extrudate. The binder materials used are resistant to the temperatures and other conditions, e.g., mechanical attrition, which occur in various hydrocarbon conversion processes.

Examples of binder materials that may be employed with the molecular sieves of or manufactured by the process of the invention include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Examples of other materials include porous matrix materials such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The molecular sieves of or manufactured by the process of the present invention may be used, for example, in the form of pills, spheres or extrudates with or without conventional binder. The molecular sieves find particular application in hydrocarbon conversion processes and absorption processes.

Examples of preferred processes include hydrocarbon conversion processes where reduced non-selective acidity is important for reaction selectivity and/or the maintenance of catalyst activity, such as alkylation, dealkylation, disproportionation, and transalkylation reactions. Particular mention may be made of ethylbenzene conversion, xylene isomerization, toluene disproportionation and selective toluene disproportionation. The conversion of hydrocarbon feeds can take place in any convenient mode, for example, in fluidized bed, moving bed, or fixed bed reactors depending on the types of process desired. Examples of hydrocarbon conversion processes include, as non-limiting examples, the following:

(A) The catalytic cracking of a naphtha feed to produce light olefins. Typical reaction conditions include a temperature from 500° C. to 750° C., pressures of subatmospheric or atmospheric, generally ranging up to 1013 kPag (10 atmospheres gauge) and residence time (volume of the catalyst/feed rate) of from 10 milliseconds to 10 seconds.

(B) The catalytic cracking of high molecular weight hydrocarbons to lower molecular weight hydrocarbons. Typical reaction conditions for catalytic cracking include temperatures of from 400° C. to about 700° C., pressures of from 10.01 to 3089 kPa (0.1 to 30 atmospheres), and weight hourly space velocities of from 0.1 to 100 $hr^{-1}$.

(C) The transalkylation of aromatic hydrocarbons in the presence of polyalkylaromatic hydrocarbons. Typical reaction conditions include a temperature of from 200° C. to 500° C., a pressure of from about atmospheric to 20.26 MPa (200 atmospheres), a weight hourly space velocity of from 1 to 100 $hr^{-1}$ and an aromatic hydrocarbon/polyalkylaromatic hydrocarbon mole ratio of from 0.5/1 to 16/1.

(D) The isomerization of aromatic feedstock components, for example, xylenes. Typical reaction conditions for such include a temperature of from 230° C. to 510° C., a pressure of from 50.6 to 5065 kPa (0.5 to 50 atmospheres), a weight hourly space velocity of from 0.1 to 200 $hr^{-1}$ and a hydrogen /hydrocarbon mole ratio of from 0 to 100.

(E) The dewaxing of hydrocarbons by selectively removing straight chain paraffins. The reaction conditions are dependent in large measure on the feed used and upon the desired pour point. Typical reaction conditions include a temperature between 200° C. and 450° C., a pressure up to 20.69 MPag (3,000 psig) and a liquid hourly space velocity from 0.1 to 20.

(F) The alkylation of aromatic hydrocarbons, e. g., benzene and alkylbenzenes, in the presence of an alkylating agent, e. g., olefins, formaldehyde, alkyl halides and alcohols having 1 to about 20 carbon atoms. Typical reaction conditions include a temperature of from 100° C. to 500° C., a pressure of from atmospheric to 20.26 MPa (200 atmospheres), a weight hourly space velocity of from 1 $hr^{-1}$ to 100 $hr^{-1}$ and an aromatic hydrocarbon/alkylating agent mole ratio of from 1/1 to 20/1.

(G) The alkylation of aromatic hydrocarbons, e.g., benzene, with long chain olefins, e.g., $C_{14}$ olefin. Typical reaction conditions include a temperature of from 50° C. to 200° C., a pressure of from atmospheric to 20.26 MPa (200 atmospheres), a weight hourly space velocity of from 2 $hr^{-1}$ to 2000 $hr^{-1}$ and an aromatic hydrocarbon/olefin mole ratio of from 1/1 to 20/1. The resulting products from the reaction are long chain alkyl aromatics which when subsequently sulfonated have particular application as synthetic detergents.

(H) The alkylation of aromatic hydrocarbons with light olefins to provide short chain alkyl aromatic compounds, e. g., the alkylation of benzene with propylene to provide cumene. Typical reaction conditions include a temperature of from 10° C. to 200° C., a pressure of from 101 to 3039 kPa (1 to 30 atmospheres), and an aromatic hydrocarbon weight hourly space velocity (WHSV) of from 1 $hr^{-1}$ to 50 $hr^{-1}$.

(I) The hydrocracking of heavy petroleum feedstocks, cyclic stocks, and other hydrocrack charge stocks. The catalyst will contain an effective amount of at least one hydrogenation component of the type employed in hydrocracking catalysts.

(J) The alkylation of a reformate containing substantial quantities of benzene and toluene with fuel gas containing short chain olefins (e. g., ethylene and propylene) to produce mono-and di-alkylates. Preferred reaction conditions include temperatures from 100° C. to 250° C., a pressure of from 690 to 5516 kPag (100 to 800 psig), a WHSV-olefin from 0.4 $hr^{-1}$ to 0.8 $hr^{-1}$, a WHSV-reformate of from 1 $hr^{-1}$ to 2 $hr^{-1}$ and, optionally, a gas recycle from 1.5 to 2.5 vol/vol fuel gas feed.

(K) The alkylation of aromatic hydrocarbons, e. g., benzene, toluene, xylene, and naphthalene, with long chain olefins, e. g. $C_{14}$ olefin, to produce alkylated aromatic lube base stocks. Typical reaction conditions include temperatures from 160° C. to 260° C. and pressures from 2413 to 3103 kPag (350 to 450 psig).

(L) The alkylation of phenols with olefins or equivalent alcohols to provide long chain alkyl phenols. Typical reaction conditions include temperatures from 100° C. to 250° C., pressures from 6.9 to 2069 kPag (1 to 300 psig) and total WHSV of from 2 $hr^{-1}$ to 10 $hr^{-1}$.

(M) The conversion of light paraffins to olefins and/or aromatics. Typical reaction conditions include temperatures from 425° C. to 760° C. and pressures from 69 kPag to 13.79 MPag (10 to 2000 psig). Processes for preparing aromatic compounds from light paraffins are described in U.S. Pat. No. 5,258,563, which is hereby incorporated by reference.

(N) The conversion of light olefins to gasoline, distillate and lube range hydrocarbons. Typical reaction conditions include temperatures of from 175° C. to 375° C. and a pressure of from 690 kPag to 13.79 MPag (100 to 2000 psig).

(O) Two-stage hydrocracking for upgrading hydrocarbon streams having initial boiling points above about 200° C. to premium distillate and gasoline boiling range products or as feed to further fuels or chemicals. In a first stage, molecular sieves of or manufactured by the process of the invention may be used as catalysts comprising one or more catalytically active substances, for example a Group VIII metal, and the effluent from the first stage may be reacted in a second stage using a second zeolite catalyst, for example zeolite Beta, comprising one or more catalytically active substances, e. g., a Group VIII metal. Typical reaction conditions include temperatures from 315° C. to 455° C., a pressure from 2.76 to 17.24 MPag (400 to 2500 psig), hydrogen circulation of from 178 to 1780 $m^3/m^3$ (1000 to 10,000 SCF/bbl) and a liquid hourly space velocity (LHSV) of from 0.1 to 10.

(P) A combination hydrocracking/dewaxing process in the presence of the zeolite bound zeolite catalyst comprising a hydrogenation metal and a zeolite such as zeolite Beta. Typical reaction conditions include temperatures from 350° C. to 400° C., pressures from 9.6 to 10.4 MPag (1400 to 1500 psig), LHSVs from 0.4 to 0.6 and a hydrogen circulation from 534 to 890 $m^3/m^3$ (3000 to 5000 SCF/bbl).

(Q) The reaction of alcohols with olefins to produce mixed ethers, for example the reaction of methanol with isobutene and/or isopentene to provide methyl-t-butyl ether (MTBE) and/or t-amyl methyl ether (TAME). Typical conversion conditions include temperatures from 20° C. to 200° C., pressures from 202 kPa to 20.3 MPa (2 to 200 atm), WHSV (gram olefin per hour gram-zeolite) from 0.1 $hr^{-1}$ to 200 $hr^{-1}$ and an alcohol to olefin molar feed ratio from 0.1/1 to 5/1.

(R) The disproportionation of aromatics, for example the disproportionation of toluene, to make benzene and paraxylene. Typical reaction conditions include a temperature of from 200° C. to 760° C., a pressure of from about atmospheric to 6.08 MPa (60 atmosphere)), and a WHSV of from 0.1 $hr^{-1}$ to 30 $hr^{-1}$.

(S) The conversion of naphtha (e. g. $C_6$-$C_{10}$) and similar mixtures to highly aromatic mixtures. Thus, normal and slightly branched chained hydrocarbons, preferably having a boiling range above about 40° C., and less than about 200° C., can be converted to products having a substantially higher octane aromatics content by contacting the hydrocarbon feed with the molecular sieves of the present invention at a temperature in the range of for example from 400° C. to 600° C., preferably 480° C. to 550° C. at pressures ranging from for example, atmospheric to 4 MPa (40 bar), and liquid hourly space velocities (LHSV) ranging for example, from 0.1 to 15.

(T) Selectively separating hydrocarbons by adsorption of the hydrocarbons. Examples of hydrocarbon separation include xylene isomer separation and separating olefins from a feed stream containing olefins and paraffins.

(U) The conversion of oxygenates, e.g., alcohols, such as methanol, or ethers, such as dimethylether, or mixtures thereof to hydrocarbons including olefins and aromatics with typical reaction conditions including a temperature of from 275° C. to 600° C., a pressure of from 50.6 kPa to 5.06 MPa (0.5 atmosphere to 50 atmospheres) and a liquid hourly space velocity of from 0.1 to 100.

(V) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a catalyst comprising the molecular sieve of the invention, typically at a temperature in the range of from 250° C. to 800° C., a LHSV of from 0.2 to 50, and a hydrocarbon partial pressure of from 10.1 kPa to 5.06 MPa (0.1 to 50 atmospheres). Temperatures below about 250° C. may be used to oligomerize the feedstock when the feedstock is in the liquid phase when contacting the molecular sieve catalyst. Thus, when the olefin feedstock contacts the molecular sieve catalyst in the liquid phase, temperatures of from 10° C. to 250° C. may typically be used.

(W) The conversion of $C_2$ unsaturated hydrocarbons (ethylene and/or acetylene) to aliphatic $C_{6-12}$ aldehydes and converting such aldehydes to the corresponding $C_{6-12}$ alcohols, acids, or esters. In general, the catalytic conversion conditions include a temperature of from 100° C. to 760° C., a pressure of from 10.1 kPa to 20.26 MPa (0.1 to 200 atmospheres) and a weight hourly space velocity of from 0.08 $hr^{-1}$ to 2,000 $hr^{-1}$.

The molecular sieves of or manufactured by the process of the present invention may also be used in absorption processes, as mentioned hereinbefore. Example of such processes are absorptive separation for eg light gas separations. By way of example, mention is made of the separation of any of $CO_2$, methane and C2 to C6 hydrocarbons from each other or from admixtures of other materials, such as the separation of components from ethylene/ethane mixtures or propylene/propane mixtures.

In order to more fully illustrate the nature of the invention and the manner of practicing same, the invention is further illustrated by the following examples. In these examples, a Alpha Value parameter was measured in order to define the properties of the products that were manufactured. This parameter was measured by the technique described below.

Alpha Value is an approximate indication of the catalytic cracking activity of the catalyst compared to a standard catalyst. It represents the relative rate constant (rate of normal hexane conversion per volume of catalyst per unit time). It is based on the activity of silica-alumina cracking catalyst taken as having an Alpha Value of 1 (Rate Constant=0.016 sec.sup.-1). The Alpha Test is described in U.S. Pat. No. 3,354,078; in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538 C, and a variable flow rate as described in detail in the Journal of Catalysis, Vol. 61, p. 395 (1980).

The dimensions of the crystals produced in the examples were measured by conventional scanning electron microscopy (SEM) techniques. The crystal dimension reported (and as used in the foregoing description of the invention) means that at least one dimension of the crystal that is examined by SEM is at or greater than the µm value mentioned in context.

Example 1

Synthesis of 5 µm ZSM-5

A reaction (synthesis) mixture was prepared consisting of 250 g of deionised water, 20 g of a 50% aqueous NaOH solution, 3 g of ZSM-5 seeds and 80 g of SIRAL®95, an amorphous silica-alumina (30:1 molar silica/alumina) as supplied by Sasol/Condea. The $H_2O$/NaOH molar ratio of the reaction mixture was 62.2. The reaction mixture was charged into a Parr autoclave and crystallized for 72 hours at 160° C. (320° F.) and at a stirrer speed of 100 RPM.

Solid product was isolated from the resultant product mixture by filtration, washed with deionised water and dried at 121° C. The solid product was analysed by x-ray diffraction and Scanning Electron Microscopy (SEM) and was found to be a highly crystalline ZSM-5 with a small amount of crystalline impurities, probably layered silicate and mordenite. The product had a $SiO_2/Al_2O_3$ mole ratio of 26:1 and was free of organic structure directing agent. The SEM characterization revealed prismatic crystals of approximately 5 µm in size i.e., at least one dimension was about 5 µm). In its acid form this product had an Alpha Value of 1591.

Example 2

Synthesis of Large Crystal ZSM-5

The procedure of Example 1 was repeated with the exception that the heating was interrupted at 40 hours and the mixture cooled to room temperature and then heated for a further 32 hours. The product was large crystal ZSM-5 (similar dimension crystals as in Example 1) and had less contamination than the product of Example 1. The product had a $SiO_2/Al_2O_3$ mole ratio of 26:1 and was free of organic structure directing agent. In its acid form this product had an Alpha Value of 1648.

Example 3

Seed Free Synthesis of Very Large Crystal ZSM-5

A reaction (synthesis) mixture was prepared consisting of 114 g of deionised water, 14 g of a 45% aqueous KOH solution and 50 g of an amorphous silica-alumina precursor having a mole ratio of silica/alumina of 26:1. The $H_2O$/KOH molar ratio of the reaction mixture was 42.4. The slurry was charged into a Parr steel autoclave and crystallized for 124 hours (with interruption at 100 hours for sampling) at 190° C. (374° F.) and at a stirrer speed of 50 RPM.

Solid product was isolated from the resultant product mixture by filtration, washed with deionised water and dried at 115° C. Elemental analysis revealed that the recovered solid product comprised (by weight) 69.4% silica, 5.13% alumina, and 4.18% potassium. The product had a mole ratio of silica/alumina of 23:1. The product was analyzed by x-ray diffraction and SEM and was found to be a highly crystalline ZSM-5 molecular sieve having large crystals with typical dimensions of 20×4×4 μm. The x-ray diffraction revealed traces of impurities of other crystalline phases.

10 g of the ZSM-5 product was exchanged 3 times with 100 ml of 1M ammonium nitrate solution at room temperature to produce H-form ZSM-5. After washing and drying the crystals were activated by calcination in air for 6 hours at 540° C. The calcined material was found to have an Alpha Value of 1000 (hexane cracking), which is indicative of very high acid activity of the H-ZSM-5. Nitrogen isotherm determination confirmed a small external surface area ($10 \, m^2 g^{-1}$) consistent with a large crystal size.

While the present invention has been described and illustrated by reference to particular embodiments, those of ordinary skill in the art will appreciate that the invention lends itself to variations not necessarily illustrated herein. For this reason, then, reference should be made to the appended claims for purposes of determining the true scope of the present invention.

What is claimed is:

1. A process for the manufacture of a synthetic porous crystalline molecular sieve comprising the steps of:
    (a) forming an aqueous reaction mixture that is free of organic-containing structure directing agent and consisting of a source of $X_2O_3$, a source of $YO_2$, and a source of metal hydroxide MOH, wherein X is a trivalent element, Y is a tetravalent element and M represents an alkali metal, and wherein the aqueous reaction mixture has:
        (i) a molar ratio of $H_2O$/MOH that is 75 or less, and
        (ii) at least a portion of the $X_2O_3$ and the $YO_2$ provided by an amorphous material containing both $X_2O_3$ and $YO_2$, the amorphous material having a $YO_2/X_2O_3$ molar ratio within the range of from 15 to 40;
    (b) crystallizing the reaction mixture to produce the porous crystalline molecular sieve; and
    (c) recovering the synthetic porous crystalline molecular sieve.

2. The process according to claim 1, wherein X is aluminium and Y is silicon.

3. The process according to claim 1, wherein crystallization is effected at a temperature of 80° C. to 225° C.

4. The process according to claim 3, wherein crystallization is effected at a temperature of 100° C. to 200° C.

5. The process according to claim 1, wherein the molar ratio of $H_2O$/MOH in the reaction mixture is within the range of 20 to 50.

6. The process according to claim 1, wherein the amorphous material containing both $X_2O_3$ and $YO_2$ comprises less than 1.0 wt % $Na_2O$.

7. The process according to claim 6, wherein the amorphous material containing both $X_2O_3$ and $YO_2$ comprises less than 0.01 wt % $Na_2O$.

8. The process according to claim 1, wherein, in addition to the amorphous material containing both $X_2O_3$ and $YO_2$, the aqueous reaction mixture also comprises a separate source of $X_2O_3$.

9. The process according to claim 8, wherein the separate source of $X_2O_3$ contributes 50% or less of the total amount of $X_2O_3$ in the aqueous reaction mixture.

10. The process according to claim 9, wherein the separate source of $X_2O_3$ contributes from 20% to 45% of the total amount of $X_2O_3$ in the aqueous reaction mixture.

11. The process according to claim 1, wherein the amorphous material containing both $X_2O_3$ and $YO_2$ has a $YO_2/X_2O_3$ molar ratio within the range of from 15 to 35.

12. The process according to claim 11, wherein the amorphous material containing both $X_2O_3$ and $YO_2$ has a $YO_2/X_2O_3$ molar ratio within the range of from 15 to 32.

13. The process according to claim 12, wherein the amorphous material containing both $X_2O_3$ and $YO_2$ has a $YO_2/X_2O_3$ molar ratio within the range of from 15 to 30.

14. The process according to claim 1, wherein the alkali metal M is sodium or potassium.

15. The process according to claim 1, wherein the synthetic porous crystalline molecular sieve has the MFI structure type in the non-calcined state, and comprises crystals having at least one dimension greater than 1 μm.

16. The process according to claim 1, wherein the synthetic porous crystalline molecular sieve is of the MFI structure type and comprises crystals with at least one dimension greater than 3 μm.

17. The process according to claim 16, wherein the synthetic porous crystalline molecular sieve comprises crystals with at least one dimension greater than 10 μm.

18. The process according to claim 15, wherein the synthetic porous crystalline molecular sieve comprises:

$$(n)YO_2 : X_2O_3,$$

wherein Y is a tetravalent element; X is a trivalent element and n is at least 2 and less and less than 30.

19. The process according to claim 18, wherein the synthetic porous crystalline molecular sieve has n from 2 to 26.

20. The process according to claim 15, wherein the synthetic porous crystalline molecular sieve comprises aluminum.

21. The process according to claim 15, wherein the synthetic porous crystalline molecular sieve comprises silicon.

22. The process according to claim 15, wherein the synthetic porous crystalline molecular sieve is an aluminosilicate.

23. The process according to claim 15, wherein the synthetic porous crystalline molecular sieve is characterized by a 30% ortho-xylene sorption time test value of at least 50 minutes.

24. The process according to claim 15, further comprising the steps of hydrogen exchange and calcination of the synthetic porous crystalline molecular sieve to produce an active catalyst comprising crystals having at least one dimension greater than 1 μm.

25. A process for converting hydrocarbons comprising the steps of:
    (a) forming an aqueous reaction mixture that is free of organic-containing structure directing agent and consisting of a source of $X_2O_3$, a source of $YO_2$, and a source of metal hydroxide MOH, wherein X is a trivalent element, Y is a tetravalent element and M represents an alkali metal, and wherein the aqueous reaction mixture has:
        (i) a molar ratio of $H_2O$/MOH that is 75 or less, and
        (ii) at least a portion of the $X_2O_3$ and the $YO_2$ provided by an amorphous material containing both $X_2O_3$ and $YO_2$, said amorphous material having a $YO_2/X_2O_3$ molar ratio within the range of from 15 to 40;

(b) crystallizing the reaction mixture to produce the porous crystalline molecular sieve;
(c) recovering the synthetic porous crystalline molecular sieve; and
(d) contacting a hydrocarbon feedstream under hydrocarbon conversion conditions with the synthetic porous crystalline molecular sieve to effect conversion of the hydrocarbon feedstream.

26. An absorption process comprising the steps of:
(a) forming an aqueous reaction mixture that is free of organic-containing structure directing agent and consisting of a source of $X_2O_3$, a source of $YO_2$, and a source of metal hydroxide MOH, wherein X is a trivalent element, Y is a tetravalent element and M represents an alkali metal, and wherein the aqueous reaction mixture has:
   (i) a molar ratio of $H_2O$/MOH that is 75 or less, and
   (ii) at least a portion of the $X_2O_3$ and the $YO_2$ provided by an amorphous material containing both $X_2O_3$ and $YO_2$, said amorphous material having a $YO_2/X_2O_3$ molar ratio within the range of from 15 to 40;
(b) crystallizing the reaction mixture to produce the porous crystalline molecular sieve;
(c) recovering the synthetic porous crystalline molecular sieve; and
(d) contacting a feedstream containing one or more absorbates under absorption conditions with the synthetic porous crystalline molecular sieve to effect absorption of one or more of the absorbates from the feedstream.

* * * * *